US012128681B2

(12) United States Patent
Kusumoto

(10) Patent No.: US 12,128,681 B2
(45) Date of Patent: Oct. 29, 2024

(54) INKJET RECORDING APPARATUS, METHOD FOR CONTROLLING INKJET RECORDING APPARATUS

(71) Applicant: KYOCERA Document Solutions Inc., Osaka (JP)

(72) Inventor: Koji Kusumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 170 days.

(21) Appl. No.: 17/975,411

(22) Filed: Oct. 27, 2022

(65) Prior Publication Data

US 2023/0140366 A1 May 4, 2023

(30) Foreign Application Priority Data

Oct. 28, 2021 (JP) ................................ 2021-176124

(51) Int. Cl.
*B41J 2/045* (2006.01)

(52) U.S. Cl.
CPC ....... *B41J 2/04531* (2013.01); *B41J 2/04563* (2013.01); *B41J 2/04581* (2013.01)

(58) Field of Classification Search
CPC ................ B41J 2/04531; B41J 2/04563; B41J 2/04581; B41J 2/0452; B41J 2/01; B41J 2/04501
See application file for complete search history.

(56) References Cited

U.S. PATENT DOCUMENTS

2018/0207940 A1 7/2018 Yoda

FOREIGN PATENT DOCUMENTS

| | | | |
|---|---|---|---|
| JP | 2008213231 A | * | 9/2008 |
| JP | 2018118456 A | | 8/2018 |

* cited by examiner

*Primary Examiner* — Douglas X Rodriguez
*Assistant Examiner* — Tracey M McMillion
(74) *Attorney, Agent, or Firm* — Alleman Hall & Tuttle LLP

(57) ABSTRACT

A temperature sensor detects temperature of ink to be supplied to a plurality of nozzles. When, upon receiving a print request, a detection temperature detected by the temperature sensor is lower than a reference temperature, a control portion executes a preliminary vibration control to cause an ink meniscus oscillation to occur in each of the nozzles by vibrating the piezoelectric elements, and after the detection temperature increases up to the reference temperature, executes an ink ejection control to cause the ink to be ejected from the nozzles by vibrating the piezoelectric elements in correspondence with an output target image of a print request. When, upon receiving the print request, the detection temperature is higher than the reference temperature, the control portion executes the ink ejection control without executing the preliminary vibration control.

3 Claims, 4 Drawing Sheets

INKJET RECORDING APPARATUS, METHOD FOR CONTROLLING INKJET RECORDING APPARATUS

INCORPORATION BY REFERENCE

This application is based upon and claims the benefit of priority from the corresponding Japanese Patent Application No. 2021-176124 filed on Oct. 28, 2021, the entire contents of which are incorporated herein by reference.

BACKGROUND

The present disclosure relates to an inkjet recording apparatus and a method for controlling an inkjet recording apparatus that are configured to reduce ink viscosity.

An inkjet recording apparatus includes a recording head that includes a plurality of nozzles and a plurality of piezoelectric elements. Each of the plurality of nozzles ejects ink onto a sheet to form an image on the sheet.

Each of the plurality of piezoelectric elements pressurizes ink that is to be supplied to a corresponding one of the plurality of nozzles. The plurality of piezoelectric elements are provided in correspondence with the plurality of nozzles.

When the temperature of the ink decreases, the viscosity of the ink becomes high. When the viscosity of the ink to be supplied to each of the nozzles is high, ejection performance of the ink ejected from the nozzles with the operation of the piezoelectric elements is deteriorated.

There is known an inkjet recording apparatus that includes: a temperature detecting portion configured to detect the temperature inside the apparatus; and a heater configured to heat the ink that is to be supplied to the recording head. In this case, when the temperature detected by the temperature detecting portion is lower than a reference temperature, the inkjet recording apparatus causes the heater to operate.

SUMMARY

An inkjet recording apparatus according to an aspect of the present disclosure includes a plurality of nozzles, a plurality of piezoelectric elements, a temperature sensor, and a control portion. The plurality of nozzles eject ink onto a sheet to form an image on the sheet. The plurality of piezoelectric elements pressurize the ink that is to be supplied to the plurality of nozzles respectively. The temperature sensor detects temperature of the ink to be supplied to the plurality of nozzles. The control portion controls the plurality of piezoelectric elements. When, upon receiving a print request, a detection temperature detected by the temperature sensor is lower than a reference temperature, the control portion executes a preliminary vibration control to cause an ink meniscus oscillation to occur in each of the plurality of nozzles by vibrating the plurality of piezoelectric elements, and after the detection temperature increases up to the reference temperature, executes an ink ejection control to cause the ink to be ejected from the plurality of nozzles by vibrating the plurality of piezoelectric elements in correspondence with an output target image of the print request. When, upon receiving the print request, the detection temperature is higher than the reference temperature, the control portion executes the ink ejection control without executing the preliminary vibration control.

A method for controlling an inkjet recording apparatus according to another aspect of the present disclosure controls the inkjet recording apparatus that includes the plurality of nozzles, the plurality of piezoelectric elements, and the temperature sensor. The method includes a processor, when, upon receiving a print request, a detection temperature detected by the temperature sensor is lower than a reference temperature, executing a preliminary vibration control to cause an ink meniscus oscillation to occur in each of the plurality of nozzles by vibrating the plurality of piezoelectric elements. The method further includes the processor, after the detection temperature increases up to the reference temperature, executing an ink ejection control to cause the ink to be ejected from the plurality of nozzles by vibrating the plurality of piezoelectric elements in correspondence with an output target image of the print request. The method further includes the processor, when, upon receiving the print request, the detection temperature is higher than the reference temperature, executing the ink ejection control without executing the preliminary vibration control.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings. It should be noted that the following embodiments are examples of specific embodiments of the present disclosure and should not limit the technical scope of the present disclosure.

First Embodiment: Configuration of Inkjet Recording Apparatus 10

An inkjet recording apparatus 10 according to a first embodiment is a printer that is configured to execute a print process by an inkjet method.

In the print process, an image is formed on a sheet 9. The sheet 9 is a sheet-like image formation medium such as a sheet of paper or a resin film.

It is noted that the inkjet recording apparatus 10 may be a facsimile apparatus, a copier, or a multifunction peripheral that is configured to execute the print process by the inkjet method.

Figure 1:
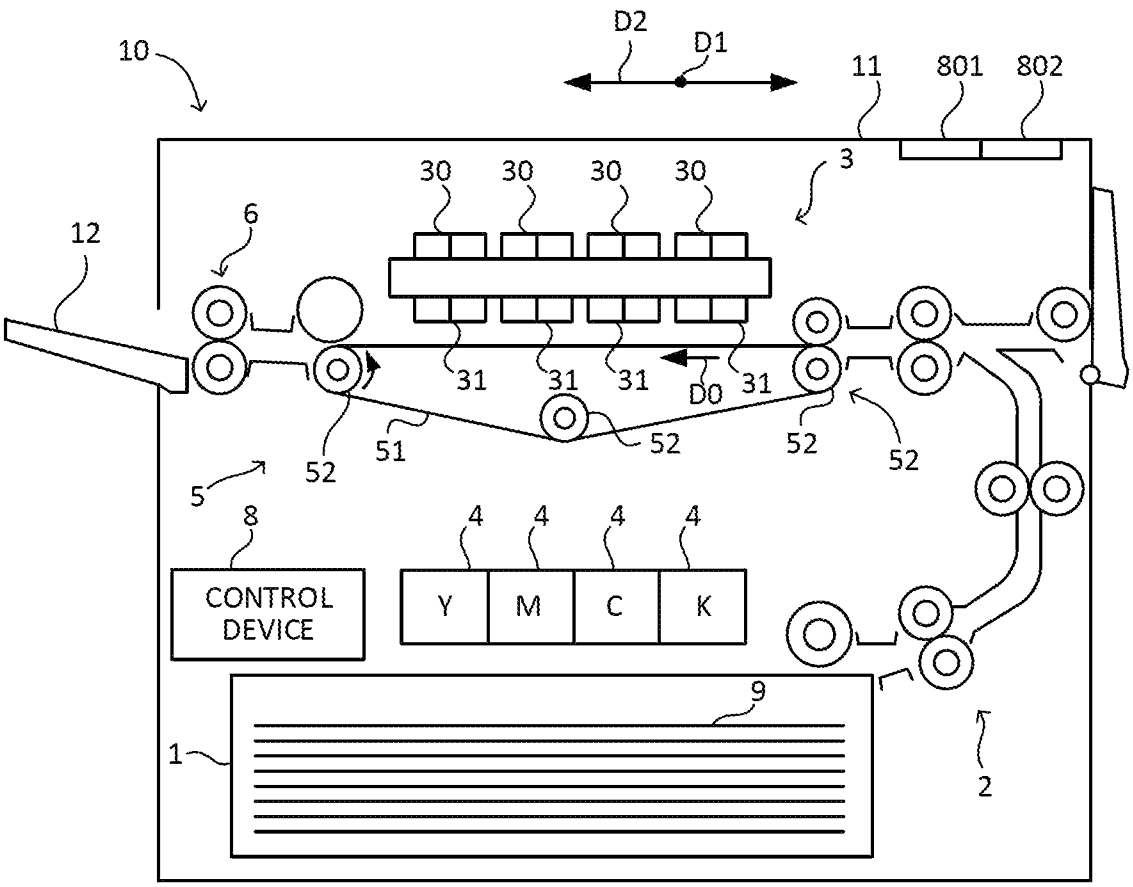
FIG. 1 is a configuration diagram of an inkjet recording apparatus according to a first embodiment.

As shown in FIG. 1, the inkjet recording apparatus 10 includes a sheet storage portion 1, a sheet supply device 2, a print portion 3, a plurality of ink containers 4, a sheet conveyance device 5, a sheet discharge device 6, and a control device 8. Furthermore, the inkjet recording apparatus 10 includes an operation device 801 and a display device 802.

The sheet supply device 2, the print portion 3, the plurality of ink containers 4, the sheet conveyance device 5, the sheet discharge device 6, and the control device 8 are disposed in a main housing 11.

The sheet storage portion 1 is configured to store a plurality of sheets 9. The sheet supply device 2 feeds the sheets 9 stored in the sheet storage portion 1 one by one to the sheet conveyance device 5.

The sheet conveyance device 5 conveys the sheet 9 in a predetermined conveyance direction D0 in a state where a surface of the sheet 9 faces the print portion 3. A direction orthogonal to the conveyance direction D0 is a main scanning direction D1, and a direction opposite to the conveyance direction D0 is a sub scanning direction D2 (see FIG. 1).

The print portion 3 forms an image on the sheet 9 by ejecting inks of a plurality of colors towards the sheet 9 conveyed by the sheet conveyance device 5.

The sheet conveyance device 5 is disposed below the print portion 3. The sheet conveyance device 5 includes a conveyance belt 51 and a plurality of stretching rollers 52.

The plurality of stretching rollers 52 rotatably support the conveyance belt 51. A motor (not shown) rotates one of the plurality of stretching rollers 52, thereby rotating the conveyance belt 51. As the conveyance belt 51 rotates, it conveys the sheet 9 on its surface in the conveyance direction DO.

The sheet discharge device 6 is disposed downstream of the sheet conveyance device 5 in the conveyance direction DO. The sheet discharge device 6 discharges the sheet 9 with an image formed thereon to a discharge tray 12 from inside the main housing 11.

The plurality of ink containers 4 store inks of predetermined colors. In the present embodiment, the colors of the inks are black, cyan, magenta, and yellow. Thus, the inkjet recording apparatus 10 includes four ink containers 4.

[Pint Portion 3]

The print portion 3 forms an image on the sheet 9 by ejecting the inks onto the sheet 9 conveyed by the sheet conveyance device 5. The print portion 3 includes a plurality of recording heads 30 corresponding to the plurality of colors of ink.

In the present embodiment, the print portion 3 includes four recording heads 30 that respectively corresponding to inks of black, cyan, magenta, and yellow.

Each of the recording heads 30 includes a nozzle unit 31. The nozzle units 31 are disposed to face an upper surface of the conveyance belt 51. The inks are supplied to the plurality of recording heads 30 from the plurality of ink containers 4.

Figure 2:
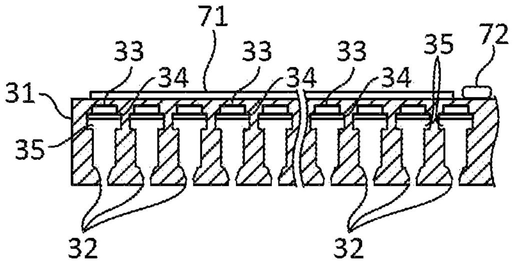
FIG. 2 is a cross section diagram of a nozzle unit in the inkjet recording apparatus according to the first embodiment.

Each of the nozzle units 31 includes a plurality of nozzles 32 (see FIG. 2). Each of the plurality of nozzles 32 ejects ink onto the sheet 9 to form an image on the sheet 9.

Each of the nozzle units 31 includes a plurality of piezoelectric elements 33, a plurality of pressure chambers 35, and a plurality of diaphragms 34. The plurality of piezoelectric elements 33, the plurality of pressure chambers 35, and the plurality of diaphragms 34 respectively correspond to the plurality of nozzles 32.

The plurality of pressure chambers 35 are respectively communicated with the plurality of nozzles 32. The plurality of pressure chambers 35 form passages via which the inks are supplied to the plurality of nozzles 32, respectively. The inks in the plurality of pressure chambers 35 are an example of inks supplied to the plurality of nozzles 32.

The plurality of diaphragms 34 respectively form a part of partition walls of the plurality of pressure chambers 35. Upon receiving a drive signal, each of the plurality of piezoelectric elements 33 pressurizes the ink inside the pressure chamber 35 via the diaphragm 34.

The drive signal is a pulse-width-modulated continuous pulse signal. The drive signal is supplied from the control device 8 to each of the plurality of piezoelectric elements 33.

That is, upon receiving the drive signal from the control device 8, each piezoelectric element 33 pressurizes the ink that is to be supplied to a corresponding one of the plurality of nozzles 32.

Upon receiving the drive signal, each piezoelectric element 33 vibrates with as much energy that causes the ink to be ejected from a corresponding nozzle 32. That is, upon receiving the drive signal, each piezoelectric element 33 pressurizes the ink inside the pressure chamber 35 to a degree where the ink is ejected from the corresponding nozzle 32.

The ink pressurized by the piezoelectric element 33 with the drive signal supplied thereto, flows from the pressure chamber 35 to a corresponding nozzle 32, and is ejected from the nozzle 32.

The operation device 801 is configured to receive human operations. For example, the operation device 801 includes operation buttons and a touch panel.

The display device 802 is configured to display information. For example, the display device 802 includes a panel display device such as a liquid crystal display panel.

[Control Device 8]

The control device 8 executes various types of data processing and controls of the devices included in the inkjet recording apparatus 10. The control device 8 is an example of a control portion that controls the plurality of piezoelectric elements 33 and other devices.

Figure 3:
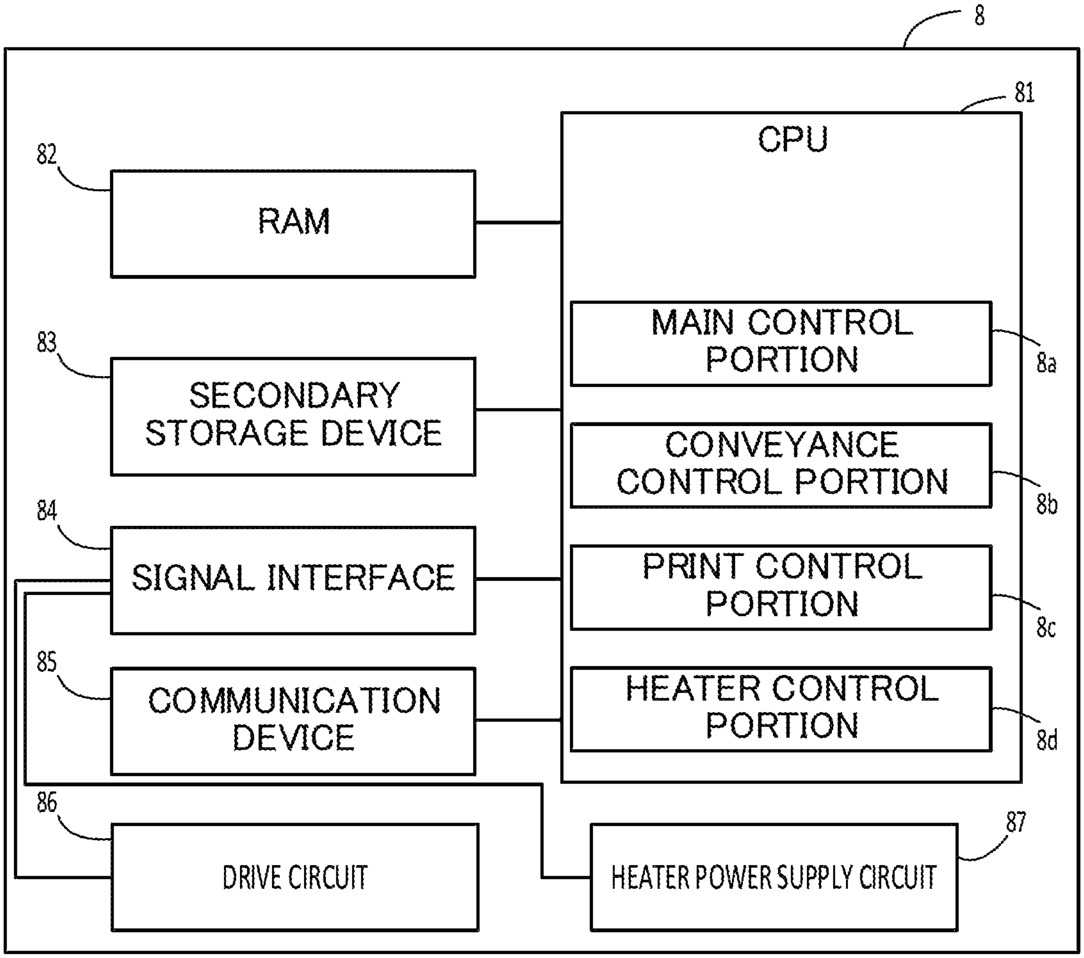
FIG. 3 is a block diagram showing a configuration of a control device in the inkjet recording apparatus according to the first embodiment.

As shown in FIG. 3, the control device 8 includes a CPU (Central Processing Unit) 81 and peripheral devices such as a RAM (Random Access Memory) 82, a secondary storage device 83, and a signal interface 84. Furthermore, the control device 8 includes a communication device 85 and a drive circuit 86.

The CPU 81 is a processor that executes various types of data processing and controls by executing computer programs. The CPU 81 is an example of a processor that controls the plurality of piezoelectric elements 33 and other devices.

The RAM 82 is a computer-readable volatile storage device. The RAM 82 primarily stores the computer programs that are executed by the CPU 81, and data that is output and consulted by the CPU 81 during execution of the various types of processing.

The secondary storage device 83 is a computer-readable nonvolatile storage device. The secondary storage device 83 is configured to store and update the computer programs and various types of data. For example, either or both of a flash memory and a hard disk drive are adopted as the secondary storage device 83.

The signal interface 84 is configured to convert signals output from various types of sensors to digital data, and transmit the digital data to the CPU 81. Furthermore, the signal interface 84 is configured to convert a control command output from the CPU 81 to a control signal and transmit the control signal to a control-target device.

The communication device 85 is configured to communicate with a host apparatus (not shown) and other apparatuses. The host apparatus is an information processing apparatus such as a personal computer or a smartphone operated by a user.

For example, the CPU 81 receives a print job from the host apparatus via the communication device 85. The print portion 3 forms on the sheet 9 an image identified by the print job.

The drive circuit 86 receives the control signal from the CPU 81 via the signal interface 84. The drive circuit 86 outputs the drive signal to each of the plurality of piezoelectric elements 33 in accordance with the received control signal.

The drive circuit 86 performs a PWM (Pulse Width Modulation) control of the drive signal in accordance with the content of the control signal. The drive circuit 86 controls, by the PWM control, the amount of ink that is ejected from each of the plurality of nozzles 32.

The CPU 81 includes a plurality of processing modules that are realized when the computer programs are executed. The plurality of processing modules include a main control portion 8*a*, a conveyance control portion 8*b*, and a print control portion 8*c*.

The main control portion 8*a* performs a control to start any one of the various types of processing in accordance with an operation performed on the operation device 801, and performs a control of the display device 802.

The conveyance control portion 8*b* controls the sheet supply device 2, the sheet conveyance device 5, and the sheet discharge device 6. That is, the conveyance control portion 8*b* controls: the supply of the sheet 9 from the sheet storage portion 1; the conveyance of the sheet 9 by the sheet conveyance device 5; and the discharge of the sheet 9 by the sheet discharge device 6.

The print control portion 8*c* causes the print portion 3 to execute the print process in synchronization with the conveyance of the sheet 9 by the sheet conveyance device 5. The print control portion 8*c* causes the print portion 3 to execute the print process by controlling the plurality of piezoelectric elements 33.

The print control portion 8*c* outputs the control signal to the drive circuit 86 via the signal interface 84. This allows the print control portion 8*c* to control the plurality of piezoelectric elements 33 via the drive circuit 86.

When the temperature of the ink decreases, the viscosity of the ink becomes high. When the viscosity of the ink to be supplied to each of the nozzles 32 is high, ejection performance of the ink ejected from the nozzles 32 with the operation of the piezoelectric elements 33 is deteriorated.

Thus the inkjet recording apparatus 10 includes a heater 71 configured to heat the ink (see FIG. 2). Furthermore, the control device 8 includes a heater power supply circuit 87 that supplies power to the heater 71 (see FIG. 3).

Furthermore, the plurality of processing modules of the CPU 81 include a heater control portion 8*d* (see FIG. 3). The heater control portion 8*d* controls the heater 71 via the heater power supply circuit 87.

Meanwhile, when the heater control portion 8*d* causes the heater 71 to operate when the environmental temperature is low, a first print time is reduced. The first print time is a time taken for the inkjet recording apparatus 10 to start the print process after receiving a print request.

The CPU 81 receiving the print job via the communication device 85 is an example of receiving the print job. In addition, the CPU 81 detecting a print start operation performed on the operation device 801 is another example of receiving the print job.

The print start operation includes an operation to specify print-target data, and a predetermined start operation.

However, if the heater control portion 8*d* causes the heater 71 to operate before receiving the print request, the heater 71 may consume power uselessly.

In addition, the heater 71 heats the ink via a passage of the ink or via a member that forms a case of the ink. In the example shown in FIG. 2, the heater 71 heats the ink via the nozzle unit 31. As a result, the thermal efficiency of heating the ink by the heater 71 is not high.

It is noted that the nozzle unit 31 is a member forming the plurality of pressure chambers 35 and the plurality of nozzles 32. The nozzle unit 31 is an example of a member forming a passage of the ink. The heater 71 heats the inks that are to be supplied to the plurality of nozzles 32.

In the inkjet recording apparatus 10, the print control portion 8*c* and the heater control portion 8*d* execute a recording head control (see FIG. 4) that is described below. With this configuration, the inkjet recording apparatus 10 reduces the viscosity of the ink while restricting power consumption.

The inkjet recording apparatus 10 includes a temperature sensor 72 for each of the nozzle units 31 (see FIG. 2). The temperature sensor 72 detects the temperature of the inks to be supplied to the plurality of nozzles 32. For example, the temperature sensor 72 is a thermistor.

In the present embodiment, the temperature sensor 72 detects the temperature of the nozzle unit 31. With this configuration, the temperature sensor 72 detects, via the nozzle unit 31, the temperature of the inks staying in the nozzle unit 31.

[Recording Head Control]

Figure 4:
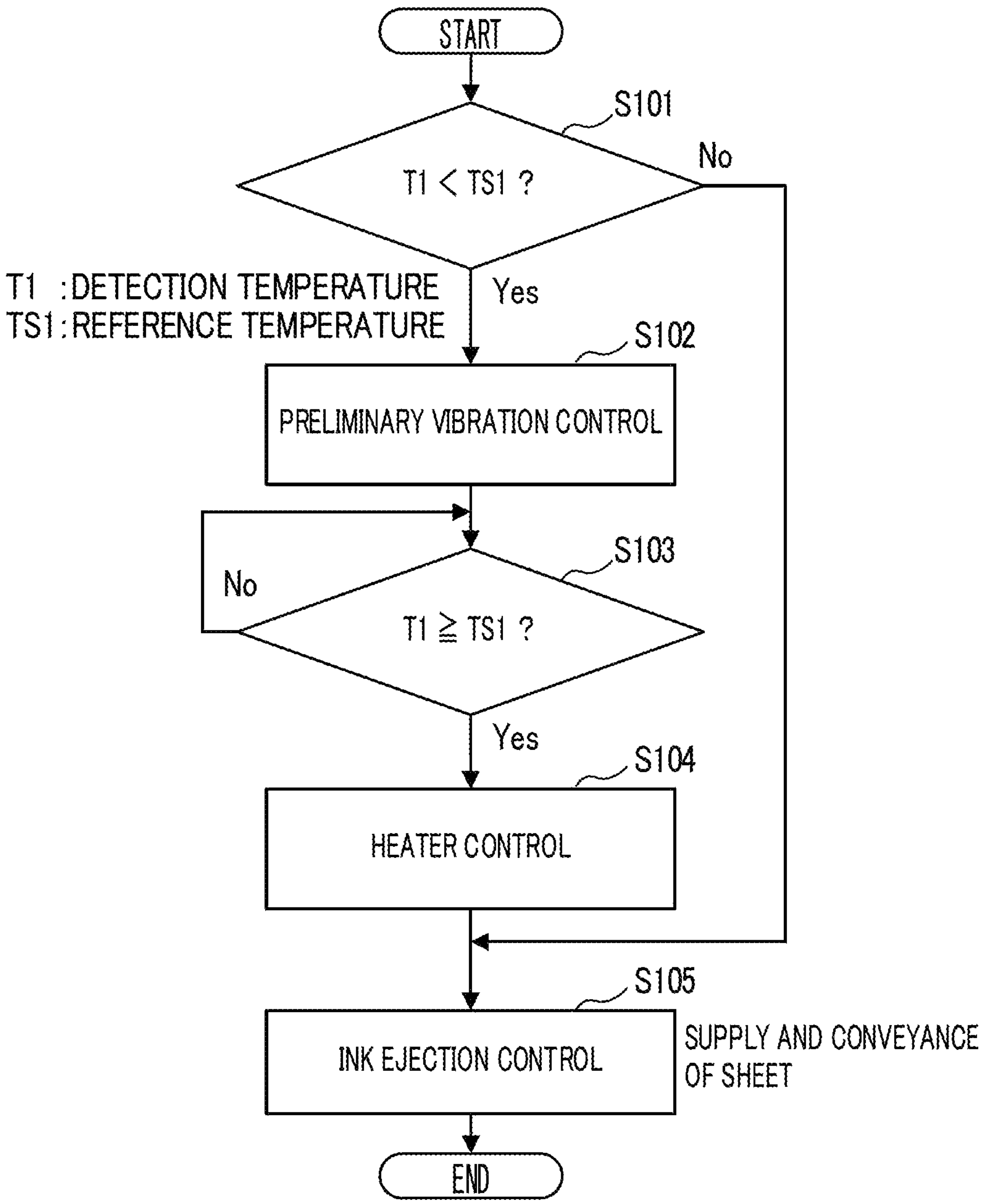
FIG. 4 is a flowchart showing an example of a procedure of a recording head control in the inkjet recording apparatus according to the first embodiment.

The following describes an example of a procedure of the recording head control with reference to the flowchart shown in FIG. 4. The print control portion 8*c* starts the recording head control when the print request is received.

For example, the print control portion 8*c* starts the recording head control when the print request is received via the communication device 85. In addition, the print control portion 8*c* also starts the recording head control when the print start operation performed on the operation device 801 is detected.

In the following description, S101, S102, . . . are identification signs representing a plurality of steps of the recording head control. The print control portion 8*c* starts the recording head control with the process of step S101.

<Step S101>

In step S101, the print control portion 8*c* determines whether or not a detection temperature T1 detected by the temperature sensor 72 is lower than a predetermined reference temperature TS1.

Upon determining that the detection temperature T1 is lower than the reference temperature TS1, the print control portion 8*c* moves the process to step S102. On the other hand, upon determining that the detection temperature T1 is equal to or higher than the reference temperature TS1, the print control portion 8*c* moves the process to step S105.

<Step S102>

In step S102, the print control portion 8*c* starts a preliminary vibration control. In the preliminary vibration control, the print control portion 8*c* supplies a predetermined preliminary vibration signal to the plurality of piezoelectric elements 33 via the drive circuit 86.

The print control portion 8*c* vibrates the plurality of piezoelectric elements 33 by supplying the preliminary vibration signal to the plurality of piezoelectric elements 33. Upon receiving the preliminary vibration signal, the plurality of piezoelectric elements 33 vibrate, and thereby an ink meniscus oscillation occurs in each of the plurality of nozzles 32.

The preliminary vibration signal vibrates the plurality of piezoelectric elements 33 with as much energy that causes the ink meniscus oscillation. Specifically, the preliminary vibration signal is a continuous pulse signal having a lower frequency and a lower duty ratio than the drive signal.

During the execution of the preliminary vibration control, the ink meniscus oscillation occurs in the pressure chambers 35 and the nozzles 32, without the ink being ejected from the nozzles 32. This increases the temperature of the ink in the pressure chambers 35 and the nozzles 32.

In addition, during the execution of the preliminary vibration control, the vibration energy of the piezoelectric elements 33 is efficiently transmitted to the inks via the diaphragms 34. This increases the temperature of the inks in the pressure chambers 35 and the nozzles 32 efficiently.

After starting the preliminary vibration control, the print control portion 8*c* moves the process to step S103.

<Step S103>

In step S103, the print control portion 8*c* determines whether or not the detection temperature T1 has increased up to the reference temperature TS1.

The print control portion 8*c* continues the preliminary vibration control while executing the process of step S103 until the detection temperature T1 increases up to the reference temperature TS1. Upon determining that the detection temperature T1 has increased up to the reference temperature TS1, the print control portion 8*c* moves the process to step S104.

<Step S104>

In step S104, the heater control portion 8*d* starts a heater control to control the operation of the heater 71 via the heater power supply circuit 87.

In the present embodiment, the heater control is a feedback control of the heater 71 based on the detection temperature T1.

For example, when the detection temperature T1 is lower than a first target temperature, the heater control portion 8*d* causes the heater power supply circuit 87 to supply power to the heater 71 until the detection temperature T1 increases up to a second target temperature. The second target temperature is higher than the first target temperature.

Furthermore, when the detection temperature T1 is higher than the second target temperature, the heater control portion 8*d* causes the heater power supply circuit 87 to stop the power supply to the heater 71 until the detection temperature T1 decreases up to the first target temperature.

It is noted that the heater control may be a PID control based on the detection temperature T1 and the first target temperature.

The heater control portion 8*d* continues the heater control until the print process corresponding to the print request is completed. After starting the heater control, the heater control portion 8*d* moves the process to step S105.

<Step S105>

When the process of step S105 is executed, the conveyance control portion 8*b* causes the sheet supply device 2 and the sheet conveyance device 5 to perform the supply and the conveyance of the sheet 9.

In step S105, the print control portion 8*c* executes an ink ejection control in synchronization with the conveyance of the sheet 9.

When the process of step S105 is executed through the process of step S102, the print control portion 8*c* executes the ink ejection control after the preliminary vibration control is completed.

In the ink ejection control, the print control portion 8*c* outputs, to the plurality of piezoelectric elements 33 via the drive circuit 86, a drive signal that corresponds to an output target image of the print request.

That is, in the ink ejection control, the print control portion 8*c* vibrates the plurality of piezoelectric elements 33 with as much level of energy that causes the inks to be ejected from the plurality of nozzles 32. In other words, the print control portion 8*c* causes the inks to be ejected from the plurality of nozzles 32 by vibrating the plurality of piezoelectric elements 33 in correspondence with the output target image.

With the process of step S105, the print process corresponding to the print request is executed. The print control portion 8*c* executes the ink ejection control until the print process corresponding to the print request is completed, and then ends the recording head control.

As described above, the print control portion 8*c* executes the preliminary vibration control when, upon receiving the print request, the detection temperature T1 detected by the temperature sensor 72 is lower than the reference temperature TS1 (see steps S101 and S102).

Furthermore, after the detection temperature T1 is increased up to the reference temperature TS1 by the preliminary vibration control, the print control portion 8*c* executes the ink ejection control in correspondence with the output target image of the print request (see steps S103 and S105).

On the other hand, the print control portion 8*c* executes the ink ejection control without executing the preliminary vibration control when, upon receiving the print request, the detection temperature T1 is higher than the reference temperature TS1 (see steps S101 and S105).

With the execution of the recording head control, the heater 71 does not operate before the print request occurs. As a result, it does not happen that the heater 71 consumes power uselessly. In addition, the temperature of the inks in the pressure chambers 35 and the nozzles 32 is efficiently increased by the occurrence of the ink meniscus oscillation. As a result, it is possible to reduce the viscosity of the ink while restricting the power consumption.

In addition, the heater control portion 8*d* executes the feedback control of the heater 71 based on the detection temperature T1 when, upon receiving the print request, the detection temperature T1 is lower than the reference temperature TS1 (see steps S101 and S104).

In the present embodiment, when, upon receiving the print request, the detection temperature T1 is lower than the reference temperature TS1, the heater control portion 8*d* executes the feedback control of the heater 71 after the detection temperature T1 is increased up to the reference temperature TS1 by the preliminary vibration control (see steps S101 to S104).

On the other hand, the heater control portion 8*d* does not execute the feedback control of the heater 71 when, upon receiving the print request, the detection temperature T1 is higher than the reference temperature TS1 (see step S101).

The inks whose temperature is increased by the preliminary vibration control are only the inks that stay in the pressure chambers 35 and the nozzles 32 before the ink ejection control is executed. With the execution of the feedback control of the heater 71, the viscosity of the inks that flow into the nozzles 32 is maintained appropriately even when the print process is executed to deal with a large number of sheets 9.

Second Embodiment

Next, an inkjet recording apparatus according to a second embodiment is described with reference to FIG. 5.

The inkjet recording apparatus according to the present embodiment has the same configuration as the inkjet recording apparatus 10 according to the first embodiment.

Figure 5:
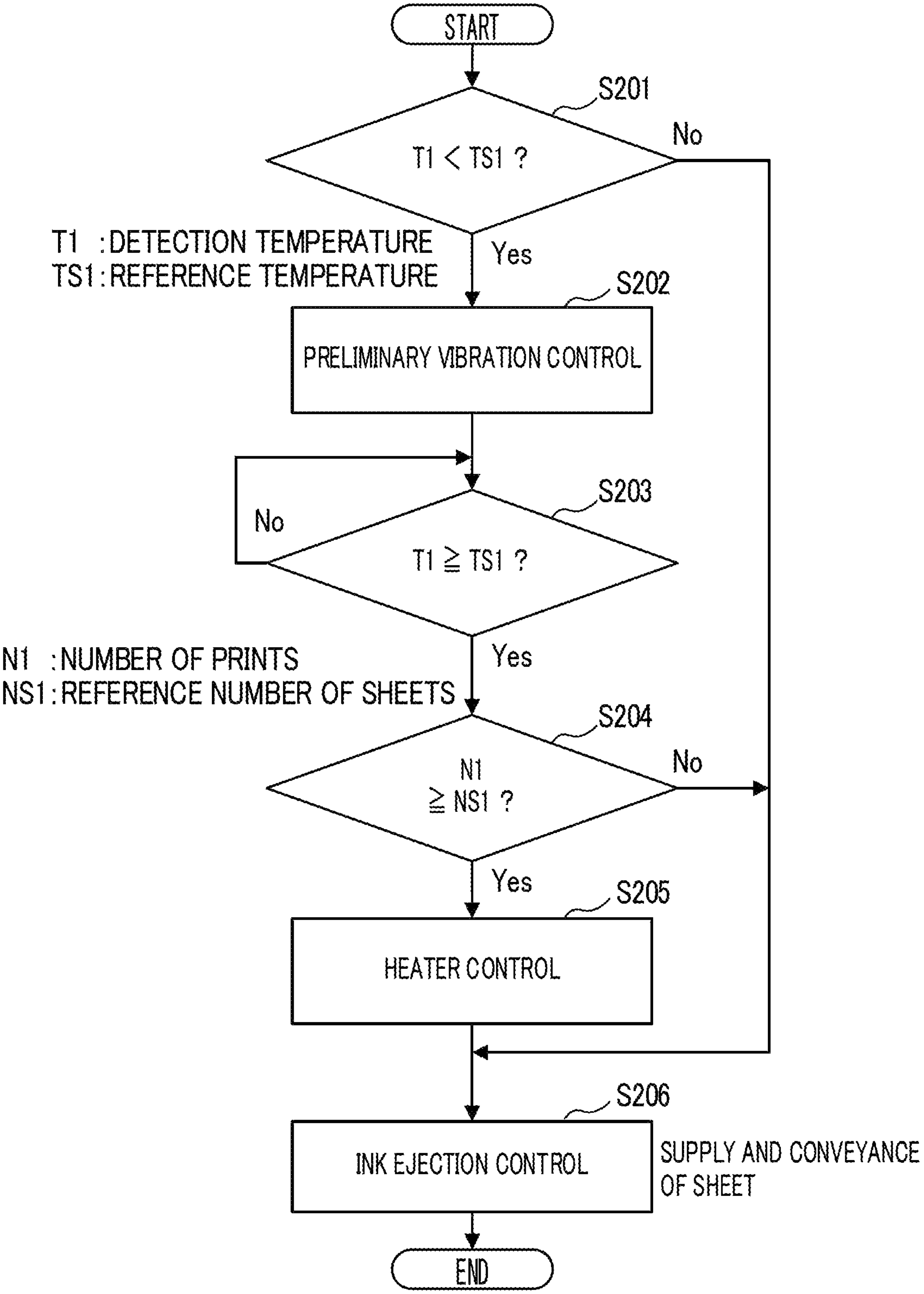
FIG. 5 is a flowchart showing an example of the procedure of the recording head control in an inkjet recording apparatus according to a second embodiment.

In the present embodiment, the print control portion 8*c* and the heater control portion 8*d* execute the recording head control, for example, by the procedure shown in FIG. 5.

The following describes an example of the procedure of the recording head control of the present embodiment with reference to the flowchart shown in FIG. 5. In the present embodiment, too, the print control portion 8*c* starts the recording head control when the print request is received.

In the following description, S201, S202, . . . are identification signs representing a plurality of steps of the recording head control. In the present embodiment, the print control portion 8*c* starts the recording head control with the process of step S201.

<Step S201>

In step S201, the print control portion 8*c* determines whether or not the detection temperature T1 detected by the temperature sensor 72 is lower than the predetermined reference temperature TS1. The process of step S201 is the same as the process of step S101 shown in FIG. 4.

Upon determining that the detection temperature T1 is lower than the reference temperature TS1, the print control portion 8*c* moves the process to step S202. On the other hand, upon determining that the detection temperature T1 is equal to or higher than the reference temperature TS1, the print control portion 8*c* moves the process to step S206.

<Step S202>

In step S202, the print control portion 8*c* starts the preliminary vibration control. The process of step S202 is the same as the process of step S102 shown in FIG. 4.

After starting the preliminary vibration control, the print control portion 8*c* moves the process to step S203.

<Step S203>

In step S203, the print control portion 8*c* determines whether or not the detection temperature T1 has increased up to the reference temperature TS1. The process of step S203 is the same as the process of step S103 shown in FIG. 4.

Upon determining that the detection temperature T1 has increased up to the reference temperature TS1, the print control portion 8*c* moves the process to step S204.

<Step S204>

In step S204, the print control portion 8*c* determines whether or not a number of prints N1 specified in the print request is equal to or larger than a predetermined reference number of sheets NS1.

The reference number of sheets NS1 indicates the number of sheets 9 that can be printed with the inks staying in the pressure chambers 35 and the nozzles 32.

Upon determining that the number of prints N1 is equal to or larger than the reference number of sheets NS1, the print control portion 8*c* moves the process to step S205. On the other hand, upon determining that the number of prints N1 is smaller than the reference number of sheets NS1, the print control portion 8*c* moves the process to step S206.

<Step S205>

In step S205, the heater control portion 8*d* starts the heater control. As described above, the heater control is a feedback control of the heater 71 based on the detection temperature T1. The process of step S205 is the same as the process of step S104 shown in FIG. 4.

The heater control portion 8*d* continues the heater control until the print process corresponding to the print request is completed. After starting the heater control, the heater control portion 8*d* moves the process to step S206.

<Step S206>

When the process of step S206 is executed, the conveyance control portion 8*b* causes the sheet supply device 2 and the sheet conveyance device 5 to perform the supply and the conveyance of the sheet 9.

In step S206, the print control portion 8*c* executes the ink ejection control in synchronization with the conveyance of the sheet 9. The process of step S206 is the same as the process of step S105 shown in FIG. 4.

When the process of step S206 is executed through the process of step S202, the print control portion 8*c* executes the ink ejection control after the preliminary vibration control is completed.

With the process of step S206, the print process corresponding to the print request is executed. The print control portion 8*c* executes the ink ejection control until the print process corresponding to the print request is completed, and then ends the recording head control.

With the adoption of the inkjet recording apparatus according to the present embodiment, the same effect is produced as with the adoption of the inkjet recording apparatus 10.

In the present embodiment, the print control portion 8*c* executes the feedback control of the heater 71 based on the detection temperature T1 when, upon receiving the print request, a first predefined condition is satisfied (see steps S201, S204, and S205). The first predefined condition is that the detection temperature T1 is lower than the reference temperature TS1, and the number of prints N1 specified in the print request is equal to or larger than the reference number of sheets NS1.

Furthermore, the heater control portion 8*d* does not execute the feedback control of the heater 71 when, upon receiving the print request, a second predefined condition or a third predefined condition is satisfied (see steps S201 and S204).

The second predefined condition is that the detection temperature T1 is lower than the reference temperature TS1, and the number of prints N1 is smaller than the reference number of sheets NS1. The third predefined condition is that the detection temperature T1 is higher than the reference temperature TS1.

According to the present embodiment, when the number of prints N1 is small, the power consumption of the heater 71 is further reduced.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An inkjet recording apparatus comprising:

a plurality of nozzles configured to eject ink onto a sheet to form an image on the sheet;

a plurality of piezoelectric elements configured to pressurize the ink that is to be supplied to the plurality of nozzles respectively;

a temperature sensor configured to detect temperature of the ink to be supplied to the plurality of nozzles;

a control portion configured to control the plurality of piezoelectric elements; and a heater configured to heat the ink to be supplied to the plurality of nozzles, wherein when, upon receiving a print request, a detection temperature detected by the temperature sensor is lower than a reference temperature, the control portion executes a preliminary vibration control to cause an ink meniscus oscillation to occur in each of the plurality of nozzles by vibrating the plurality of piezoelectric elements, and after the detection temperature increases up to the reference temperature, executes an ink ejection control to cause the ink to be ejected from the plurality of nozzles by vibrating the plurality of piezoelectric elements in correspondence with an output target image of the print request, when, upon receiving the print request, the detection temperature is higher than the reference temperature, the control portion executes the ink ejection control without executing the preliminary vibration control, when, upon receiving the print request, the detection temperature is lower than the reference temperature, the control portion executes a feedback control of the heater based on the detection temperature, and when, upon receiving the print request, the detection temperature is higher than the reference temperature, the control portion does not execute the feedback control of the heater.

2. An inkjet recording apparatus, comprising:

a plurality of nozzles configured to eject ink onto a sheet to form an image on the sheet;

a plurality of piezoelectric elements configured to pressurize the ink that is to be supplied to the plurality of nozzles respectively;

a temperature sensor configured to detect temperature of the ink to be supplied to the plurality of nozzles;

a control portion configured to control the plurality of piezoelectric elements; and a heater configured to heat the ink to be supplied to the plurality of nozzles, wherein when, upon receiving a print request, a detection temperature detected by the temperature sensor is lower than a reference temperature, the control portion executes a preliminary vibration control to cause an ink meniscus oscillation to occur in each of the plurality of nozzles by vibrating the plurality of piezoelectric elements, and after the detection temperature increases up to the reference temperature, executes an ink ejection control to cause the ink to be ejected from the plurality of nozzles by vibrating the plurality of piezoelectric elements in correspondence with an output target image of the print request, when, upon receiving the print request, the detection temperature is higher than the reference temperature, the control portion executes the ink ejection control without executing the preliminary vibration control, when, upon receiving the print request, the detection temperature is lower than the reference temperature and a number of prints specified in the print request is equal to or larger than a reference number of sheets, the control portion executes a feedback control of the heater based on the detection temperature, and when, upon receiving the print request, the detection temperature is lower than the reference temperature and the number of prints is smaller than the reference number of sheets, the control portion does not execute the feedback control of the heater.

3. A method for controlling an inkjet recording apparatus that includes: a plurality of nozzles configured to eject ink onto a sheet to form an image on the sheet; a plurality of piezoelectric elements configured to pressurize the ink that is to be supplied to the plurality of nozzles respectively; a temperature sensor configured to detect temperature of the ink to be supplied to the plurality of nozzles; and a heater configured to heat the ink to be supplied to the plurality of nozzles, the method comprising:

a processor, when, upon receiving a print request, a detection temperature detected by the temperature sensor is lower than a reference temperature, executing a preliminary vibration control to cause an ink meniscus oscillation to occur in each of the plurality of nozzles by vibrating the plurality of piezoelectric elements;

the processor, after the detection temperature increases up to the reference temperature, executing an ink ejection control to cause the ink to be ejected from the plurality of nozzles by vibrating the plurality of piezoelectric elements in correspondence with an output target image of the print request;

the processor, when, upon receiving the print request, the detection temperature is higher than the reference temperature, executing the ink ejection control without executing the preliminary vibration control, the processor, when, upon receiving the print request, the detection temperature is lower than the reference temperature, executing a feedback control of the heater based on the detection temperature, and the processor, when, upon receiving the print request, the detection temperature is higher than the reference temperature, not executing the feedback control of the heater.

* * * * *